(12) United States Patent
Ramamurthy et al.

(10) Patent No.: US 9,053,119 B2
(45) Date of Patent: Jun. 9, 2015

(54) NAVIGATION OF FACETED DATA

(75) Inventors: Adarsh Ramamurthy, Bangalore (IN); Deepak M. Srinivasa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/976,047

(22) Filed: Dec. 22, 2010

(65) Prior Publication Data

US 2012/0166471 A1    Jun. 28, 2012

(51) Int. Cl.
```
G06F 7/00      (2006.01)
G06F 17/30     (2006.01)
G06F 3/0482    (2013.01)
```
(52) U.S. Cl.
CPC ........ *G06F 17/30126* (2013.01); *G06F 3/0482* (2013.01)

(58) Field of Classification Search
USPC .................................................. 707/805, 829
See application file for complete search history.

(56) References Cited

U.S. PATENT DOCUMENTS

| | | | |
|---|---|---|---|
| 6,307,573 B1 | 10/2001 | Barros | |
| 6,529,900 B1 | 3/2003 | Patterson et al. | |
| 6,925,608 B1 * | 8/2005 | Neale et al. | 715/763 |
| 7,707,140 B2 | 4/2010 | Leishman et al. | |
| 7,730,059 B2 | 6/2010 | Behnen et al. | |
| 7,836,110 B1 * | 11/2010 | Schoenbach et al. | 707/829 |
| 8,219,593 B2 | 7/2012 | Tunkelang et al. | |
| 8,489,647 B2 | 7/2013 | Briggs et al. | |
| 2002/0087579 A1 * | 7/2002 | Chasanoff et al. | 707/104.1 |
| 2006/0004703 A1 * | 1/2006 | Spivack et al. | 707/2 |
| 2006/0106876 A1 * | 5/2006 | MacGregor | 707/104.1 |
| 2006/0271565 A1 * | 11/2006 | Acevedo-Aviles et al. | 707/100 |
| 2006/0288039 A1 * | 12/2006 | Acevedo-Aviles et al. | 707/104.1 |
| 2007/0043699 A1 * | 2/2007 | Zhang | 707/3 |
| 2008/0005677 A1 | 1/2008 | Thompson | |
| 2008/0133473 A1 * | 6/2008 | Broder et al. | 707/3 |
| 2008/0294678 A1 | 11/2008 | Gorman et al. | |
| 2009/0119262 A1 | 5/2009 | Guo et al. | |
| 2009/0222412 A1 | 9/2009 | Lee et al. | |
| 2009/0234864 A1 * | 9/2009 | Ellis et al. | 707/100 |
| 2009/0265373 A1 | 10/2009 | Acevedo-Aviles et al. | |
| 2010/0036790 A1 | 2/2010 | Sweeney et al. | |
| 2010/0114941 A1 | 5/2010 | Von Kaenel et al. | |

(Continued)

OTHER PUBLICATIONS

U.S. Appl. No. 12/968,449—Notice of Allowance Mailed May 13, 2014.

(Continued)

*Primary Examiner* — Hosain Alam
*Assistant Examiner* — Eliyah S Harper
(74) *Attorney, Agent, or Firm* — Law Office of Jim Boice

(57) ABSTRACT

A processor implemented method, system and computer program product presents and retrieves data directories. A facet tree is initialized to present facet-converted stored tabular data and dynamically entered user-input data on multiple facet nodes. The facet nodes represent directories for the facet-converted stored tabular data and user-input data. In response to a single facet node from the multiple facet nodes being selected by a user, the single facet node is expanded by presenting, on the facet tree, all other facet nodes from the multiple facet nodes as children of the single facet node that was selected by the user. In response to a child of the single facet node being selected, value directories for the child are retrieved and presented according to a definition of the single facet node that was expanded.

12 Claims, 6 Drawing Sheets

(56) References Cited

U.S. PATENT DOCUMENTS

| | | | |
|---|---|---|---|
| 2010/0125813 A1* | 5/2010 | Choudhury | 715/853 |
| 2010/0274674 A1 | 10/2010 | Roberts et al. | |
| 2010/0312769 A1* | 12/2010 | Bailey et al. | 707/740 |
| 2011/0282855 A1 | 11/2011 | Ronen et al. | |
| 2012/0011129 A1 | 1/2012 | Van Zwol et al. | |
| 2012/0030152 A1 | 2/2012 | Pueyo et al. | |
| 2012/0053986 A1 | 3/2012 | Cardno et al. | |
| 2012/0054226 A1 | 3/2012 | Cao et al. | |
| 2012/0084328 A1 | 4/2012 | Ishikawa et al. | |
| 2012/0159301 A1 | 6/2012 | Ramamurthy et al. | |
| 2013/0166547 A1 | 6/2013 | Pasumarthi et al. | |

OTHER PUBLICATIONS

Anonymous, "Faceted Navigation", copyright 2010 Pilot Systems, pp. 1-2, http://burgers.demo.pilotsystems.net/@@faceted-navigation.

Complete Information Architecture, Inc., "Facetmap: Faceted Classification Software Tools," copyright 2009, pp. 1, http://facetmap.com.

Tower.com, Inc., "Tower.com: Buy Music CDs, DVDs, Blu-ray, Books, New Releases," copyright 2012, pp. 1-2, http://www.tower.com.

Beachhouse.com, "Beachhouse.com: Vacation Search," copyright 2012, pp. 1-2, http://www.beachhouse.com/search/index.asp.

Steven Noels, "Faceted Browser," retrieved Nov. 2, 2012, pp. 1-2, http://cocoondev.org/main/facetedBrowser/default.

CMS Review, "CMS Faceted Product Directory," retrieved Nov. 2, 2012, pp. 1, http://www.cmsreview.com/timelines/ShopFeatureDirectory.html?FeatureSetID=1&DirectoryIntroURL=http://www.cmsreview.com/HowTo/DirectoryIntro.html&DirectoryFootUrl=http://www.cmsreview.com/HowTo/DirectoryFoot.html&CSSURL=http://www.cmsreview.com/css/cmsreview.css.

R. Rao et al., "The Table Lens: Merging Graphical and Symbolic Representations in an Interactive Focus+Context Visualization for Tabular Information," Proceedings of CHI'94: Human Factors in Computing Systems, Boston, MA, Apr. 1994, pp. 318-322, 481-482.

Anonymous, "Online Analytical Processing," pp. 1-7, last modification on Oct. 16, 2012, http://en.wikipedia.org/wiki/Online_analytical_processing.

Marti Hearst, "Flamenco Fine Arts Search," retrieved Nov. 2, 2012, pp. 1, http://orange.sims.berkeley.edu/cgi-bin/flamenco.cgi/famuseum/Flamenco.

Google, "Google Maps," copyright 2012, pp. 1, retrieved Nov. 21, 2012, http://maps.google.com/.

O. Ben-Yitzhak et al., "Beyond Basic Faceted Search", WSDM'08 Proceedings of the International Conference on Web Search and Web Data Mining, Palo Alto, California, US, Feb. 11-12, 2008, pp. 33-43.

E. Dempsey et al., "Two- and Three Dimensional Visualization of National Weather Service Flood Forecasts Using ARCGIS" Proceedings of the 23rd Annual ESRI International User Conference, Jul. 7-11, 2003, pp. 1-15.

E. Oren et al., "Extending Faceted Navigation for RDF Data" The Semantic Web—ISWC 2006, Lecture Notes in Computer Science, 2006, vol. 4273/2006, pp. 559-572.

U.S. Appl. No. 12/968,449—Non-Final Office Action Mailed Mar. 29, 2013.

A. Marwick, "Faceted Navigation for Document Discovery" Feb. 14, 2008, pp. 1-17, http://www.ibm.com/developerworks/data/library/techarticle/dm-0802marwick/.

E. Stoica et al. "Automating Creation of Hierarchical Faceted Metadata Structures", Human Language Technologies 2007: The Conference of the North American Chapter of the Association for Computational Linguistics; Proceedings of the Main Conference. Association for Computational Linguistics, pp. 244-251 (2007).

M. Graham et al., "A Survey of Multiple Tree Visualisation" Palgrave Macmillan Information Visualization 9, 235-252 (Winter 2010).

M. Mohammadi-Aragh et al., "Moiretrees: Visualization and Interaction for Multi-Hierarchical Data", Eurographics—IEEE VGTC Symposium on Visualization, 2005, pp. 1-9.

M. Weiland et al., "Facet Folders: Flexible Filter Hierarchies With Faceted Metadata", CHI 2008, Extended Abstracts on Human Factors in Computing Systems, pp. 3735-3740, ACM, New York, NY.

M. Hildebrand et al., "/Facet: A Browser for Heterogeneous Semantic Web Repositories", The Semantic Web—ISWC 2006, vol. 4273, pp. 272-285.

Y. Tzitzikas et al., "Extended Faceted Taxonomies for Web Catalogs", Proceedings of the 3rd International Conference on Web Information Systems Engineering (WISE'02), Dec. 11, 2002, pp. 1-10.

"YUI 2: Treeview" Yahoo! Developer Network, http://developer.yahoo.com/yui/treeview/.

"PYGTK 2.0 Tutorial: Chapter 14. Tree View Widget" http:/www.pygtk.org/pygtk2tutorial/ch-TreeViewWidget.html.

J. Polowinski, "Widgets for Faceted Browsing", Human Interface and the Management of Information, Springer Berlin, 2009, pp. 601-610 (Abstract Only).

Ruger et al, "Zoom Navigation Exploring Large Information and Application Spaces", ACM, AVI '96, Gubbio, Italy, pp. 40-48.

U.S. Appl. No. 12/968,449—Final Office Action Mailed Jan. 22, 2014.

\* cited by examiner

NAVIGATION OF FACETED DATA

BACKGROUND

The present disclosure relates to the field of computers, and specifically to the use of computers in managing data. Still more particularly, the present disclosure relates to the use of computers in displaying data on a user interface.

Typically, the ratio of business users to IT users in an enterprise is high. As more and more data is being generated within and outside enterprises, user interfaces to facilitate a non-technical business user to navigate and select data from data sources are becoming increasingly important. Reliance of business users on IT departments to help them with consumption of this data for various situational needs is not a scalable and sustainable trend.

BRIEF SUMMARY

A processor implemented method, system and computer program product presents and retrieves data directories. A facet tree is initialized to present facet-converted stored tabular data and dynamically entered user-input data on multiple facet nodes. The facet nodes represent directories for the facet-converted stored tabular data and user-input data. In response to a single facet node from the multiple facet nodes being selected by a user, the single facet node is expanded by presenting, on the facet tree, all other facet nodes from the multiple facet nodes as children of the single facet node that was selected by the user. In response to a child of the single facet node being selected, value directories for the child are retrieved and presented according to a definition of the single facet node that was expanded.

DETAILED DESCRIPTION

Figure 1:
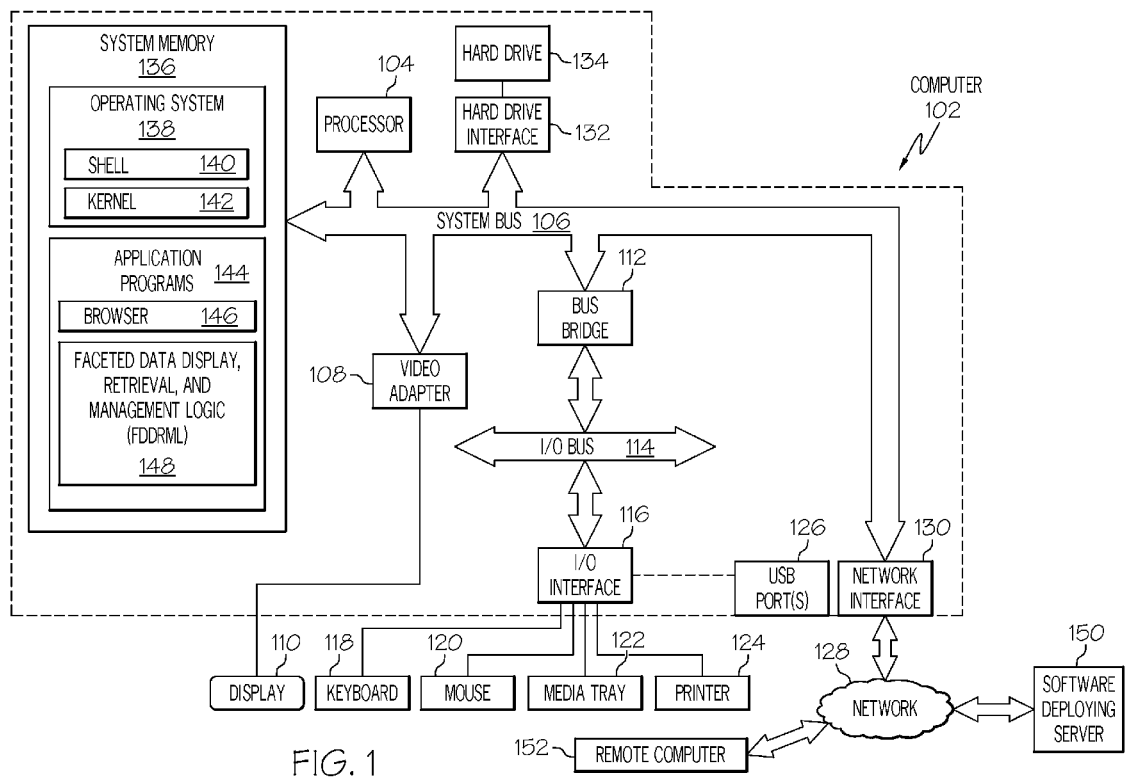
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or 'system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, and/or a remote computer 152. In one embodiment, the processes described herein are executed by computer 102, and are then presented to a display and/or storage system on computer 102 and/or remote computer 152.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or a remote computer 152 using a network interface 130 to a network 128. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a faceted data display, retrieval and management logic (FDDRML) 148. FDDRML 148 includes code for implementing the processes described below, including those described in FIGS. 2-6. In one embodiment, computer 102 is able to download FDDRML 148 from software deploying server 150, including in an on-demand basis, wherein the code in FDDRML 148 is not downloaded until needed for execution to define and/or implement the improved enterprise architecture described herein. Note further that, in one embodiment of the present invention, software deploying server 150 performs all of the functions associated with the present invention (including execution of FDDRML 148), thus freeing computer 102 from having to use its own internal computing resources to execute FDDRML 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
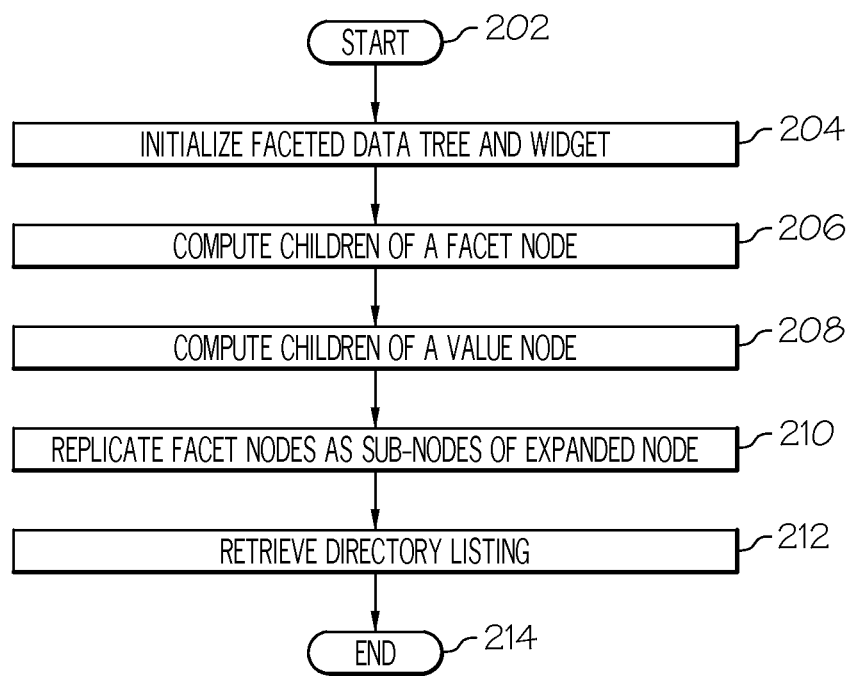
FIG. 2 is a high level flow chart of one or more exemplary steps performed by a processor to manage data.

With reference now to FIG. 2, a high level flow chart of one or more exemplary steps performed by a processor to manage data in a faceted manner is presented. After initiator block 202, a faceted data tree is initialized (block 204). This initialization includes converting data (existing tabular data as well as any new user entries) into a faceted format.

As presented herein, faceted interfaces offer the ability for a non-technical person to be able to browse data sets in a faceted manner. By providing an input source, users can mount this faceted file system at a specified point in a local OS. In one embodiment, the input source is tabular data, an example of which is provided below. Note that the method presented here is not just applicable to cases where this input data is readily available in one place as a file. Instead, input data can be generated dynamically, or the input source can be an external system with a data adapter in between that converts data coming from the external system into tabular form.

For exemplary purposes, a simple set of tabular data is assumed as input, as shown below in TABLE I.

TABLE I

LineItems Data

| Department | Employee | Status | Line item name | Project name |
|---|---|---|---|---|
| Software | Employee A | In progress | Line item 1 | Project 1 |
| Software | Employee B | In progress | Line item 2 | Project 2 |
| Software | Employee B | In progress | Line item 3 | Project 2 |
| Software | Employee C | In progress | Line item 4 | Project 2 |
| Software | | | | Project 3 |
| Software | | | | Project 4 |
| Hardware | Employee D | In progress | Line item 5 | Project 5 |
| Hardware | Employee E | In progress | Line item 6 | Project 6 |
| Hardware | Employee E | Complete | Line item 7 | Project 6 |
| Hardware | Employee E | In progress | Line item 8 | Project 6 |

Note that the rows may or may not be fully populated (e.g., the rows for Projects 3 and 4 are not fully populated).

With the above input provided and the file system mounted through the specially written driver, the following mapping happens. First, the root directory is created with the name of the data source input provided. Next, column headings (facets) of input data become directories in the file system. Next, cell values or facet values become directories in the file system. Thus, each facet value will be a directory within the directory that corresponds to its facet. This results in the path of a particular directory or file representing a faceted query on the input data corpus.

Every directory may contain data.* files, where the extension can be any supported format (like data.json, data.xml, data.html, data.txt, etc.). The contents of a data.* file will be the subset of data from the input data corpus that satisfy the facet-value constraints imposed by the faceted query represented by the path of the file.

Figure 3:
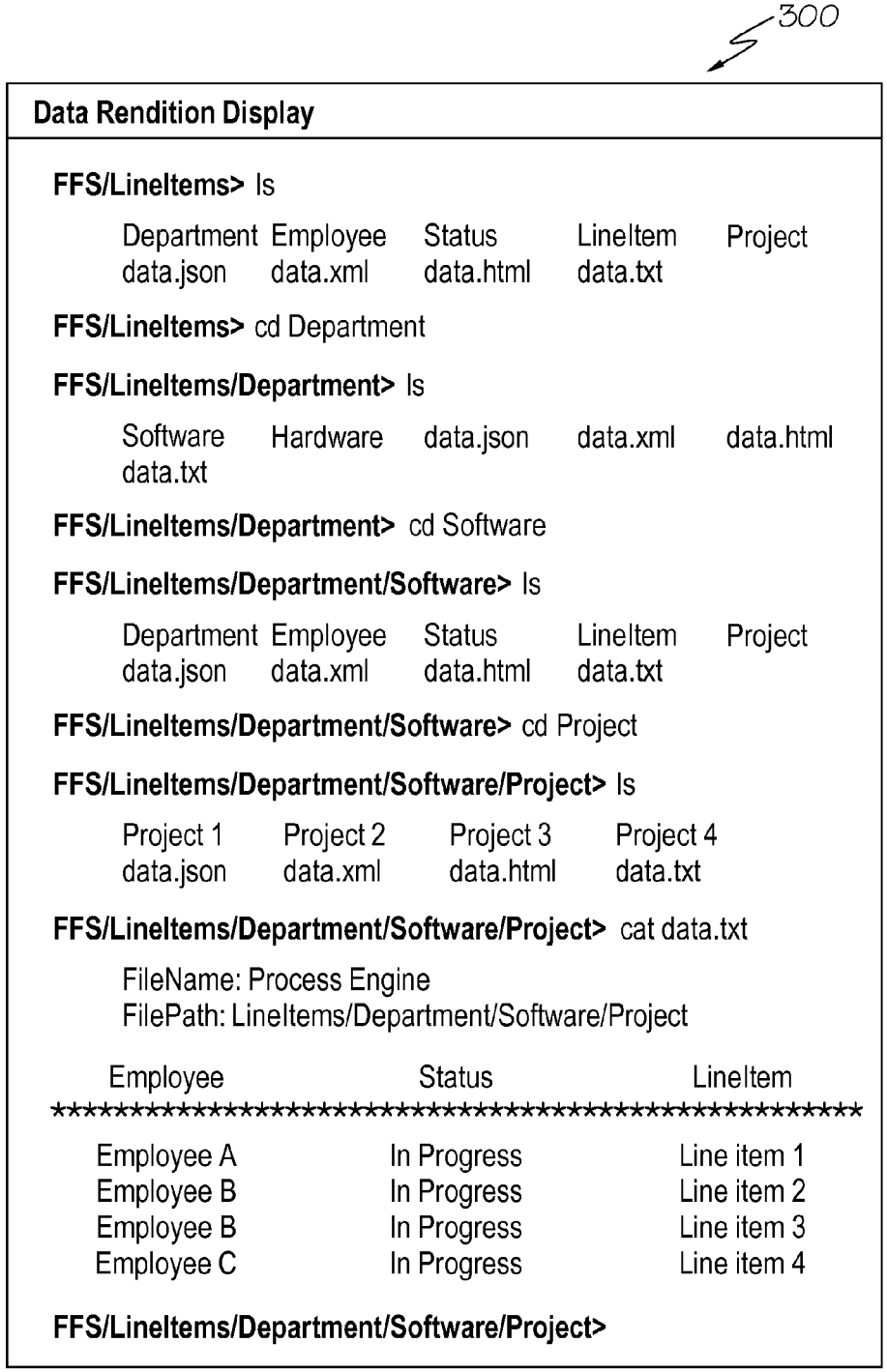
FIG. 3 depicts a data rendition page generated from the table of data.

An example interaction with such a Faceted File System is illustrated in data rendition display 300 shown in FIG. 3. Assume that the file system has already been mounted with the above example input. Some of the benefits of the data rendition display 300 are as follows. First, this display provides fast navigation of faceted data and its subsets. That is, a user can drill down quickly to the exact subset of data required for a situation. Second, users find it easy and intuitive to use a familiar file system interface to navigate and select from faceted data corpus. Third, UNIX programs and tools written for working with standard files and stdin/stdout streams can be applied to data sources (suitably transformed beforehand into the faceted data model required as input for this file system driver). Fourth, the files and directories in this file system can be used with regular file system calls (like fopen, fclose, etc.) by C, C++ or scripts for doing more sophisticated processing. Thus, it provides a good programming model interface to faceted data. Fifth, no single taxonomy is imposed on the data. Therefore users can start from any facet and move in any direction from there. This relieves the users/programmers of the need to know the way in which data is structured/organized. Sixth, when this system is combined with adapters that can convert data from different data sources into the faceted data model, the business value increases multi-fold. In such cases, the present disclosure facilitates user/programmer interactions with any external system in a faceted manner through the ubiquitous file system interface and programming model.

As described in FIG. 3, in one embodiment faceted data is displayed for navigation and access using a file system oriented approach. In another embodiment, such file navigation and access are performed via a unique faceted multi-tree widget, whose output is presented in FIG. 4 as navigation tree 400. Navigation tree 400 is easily usable by business users who are already familiar with tree widget. However, there is a significant difference, which is outlined below.

This exemplary faceted multi-tree widget (e.g., part of FDDRML 148 shown in FIG. 1) is showing data from a data corpus containing information about line items, projects, employees, managers, departments, etc. in a R&D organization. Therefore, the root of this tree is called "Line Items", which is the title of the data corpus (in tabular form) that is input to this faceted multi-tree.

Observe the children of "LineItems" root. It lists all the facets (or attributes, or column headings in tabular data) as the next possible nodes that can be selected by the user. In the exemplary navigation tree 400 shown, the user has selected "line_item.Current_Status" as the child that is further expanded. This lists the values for the expanded facet. There are four values in this case, and the user selects the node "Not Started" to be further expanded. The main difference between a faceted multi-tree and a regular tree widget becomes apparent when one sees the children of "Not Started" node. Notice that all the facets (except the one already drilled into) has been listed as children on "Not Started" node. That is, all facets that have not been selected and expanded (e.g., facets 402a and 402b) now are combined and depicted as child facets 404 of the facet "Not Started". This allows the user to choose any other facets now and drill down further into it to choose its values. Note that the values for the facets will be determined by the previous selections of facets and corresponding facet values. For example, if one opens up the "project.Project_Name" node, only those projects which have the status "Not Started" will be listed.

In this manner, the faceted multi-tree gives all possible options for a user to move forward, depending on the choices he has already made until that point. Some of the benefits of having such a faceted multi-tree widget are:

Fast selection and navigation of data is possible. No single taxonomy is imposed when using this kind of faceted data with multi-tree navigation. If the above data were to be organized in a regular tree like fashion, then there would be imposition of a single taxonomy. For example, the organization of data could have been: Departments>Projects>LineItems>Employees and so on. This means that the user should know about such an organization while using the tree, or will take a while to navigate the tree and learn about the taxonomy imposed by the tree. So, if the user has to get information about all "Department Names" working on projects whose status is "In Progress", then in the case of a regular tree, that user would have to expand Departments>Projects>LineItems and check the status of each Line Item, and then note the department. The user would have to repeat the action for every department listed and this becomes time consuming. However, with the faceted multi-tree widget, the user can simply go to Current_Status>In_Progress>Department_Name and get the result for his query. This faceted interaction in a tree therefore allows him to navigate data faster.

Exploration of data in the absence of knowledge of metadata. The users need not be aware of how data is organized and which field relates to what. This makes it easy for them to just define their query mentally in the form of facets and their constraining values and go about using the widget easily.

Start anywhere, Go anywhere. The absence of a single taxonomy and use of a faceted interaction allows the user to start from an arbitrary point, and then go in any possible direction. For example, a person browsing a product directory on an online e-commerce store using the proposed faceted multi-tree widget might start by saying Color>Black>ProductName. This will list all products that have color as black. This could be a mobile phone, or a television set. He can then further choose to drill down by expanding nodes like Category>Mobile Phone, etc. after noticing that he is getting a lot of other products that he is not interested in.

Search and Auto-suggest. These additions to the basic widget makes it possible for a user to quickly navigate to the correct node (either facet or facet value) by using an integrated search box (that appears below every node), and also using the auto-suggest feature this search box has. This makes navigation in a tree with lots of facets and values easier and quicker.

Note that the faceted multi-tree widget requires support from the underlying user interface toolkit to provide events that relate to expansion of tree nodes. Children of a particular tree node are to be computed dynamically for this widget and therefore hooking into such events is necessary.

For exemplary purposes, assume that data corpus for which a faceted multi-tree widget is to be used is available in tabular fashion, such as that found in TABLE I above. As noted above, other forms of data (like object relational, hierarchical, etc.) can be converted to tabular data before invoking this widget.

With reference again to block 202 of FIG. 2, the widget for the faceted data tree is also initialized. In order accomplish this widget initialization, the root of the tree widget is first initialized to the name of the data corpus. The children of the root are then set to the list of column names in the data corpus. The tree is organized in such a fashion that apart from the root (which corresponds to the entire data corpus) there is an alternation between facet and facet value as the nodes of the tree are expanded. That is, the children of the root will all be facets. The children of each of these facets will be values for the facets. Further, the children of each of those values will again be facets, and so on. The event handler is then registered for a treeWillExpand event. Because of the way the tree is organized as described herein, there are two cases that need to be identified. When a node that represents a facet is being expanded, the process leads to that represented by block 206. When a node that represents a facet value is being expanded, the process leads to that represented by block 208.

For example, in the case of the input data given above in TABLE I, the initialization step results in: 1) a root being named LineItems (name of the data in TABLE I); and the name of the children of the root are {department.Department_Name, employee.Employee_Name, line_item.Current_Status, line_item.Line_Item_Name, project.Project_Name}

As described in block 206, children of a facet node are then computed. When the treeWillExpand event handler is invoked, the complete path of the selected node can be obtained. For example, LineItems/department.Department_Name/Software/project.ProjectName can be a complete path. There are three substeps to the process depicted in block 206. First, from the path of the selected node, a faceted query (with Selection and Projection parts) is created as follows. First, leave out the root. Second, treat the further segments in the path as facets and corresponding values alternately. Third, if there is a last segment of the path that is a facet, then call that as the Projection part of the query. The remaining part is the Selection part of the query. Note that in the case of a facet node having children, there will always be a Projection component.

The second sub-step of the process depicted in block 206 is to execute the selection part of the query on the input table such that facets (columns) satisfy the provided value constraints. Only those rows that satisfy all the facet-value constraints provided in the faceted query are retained from the input table.

The third sub-step of the process depicted in block 206 is to retain only the column that is projected. Distinct values available in this column are computed and returned as the children of the facet node.

For the example input given above in TABLE I, suppose the selected node and the corresponding complete path is LineItems/line_item.Current_Status/In Progress/department.Department_Name/Software/project.ProjectName. The Selection Part may be (line_item.CurrentStatus=In Progress) and (department.DepartmentName=Software), and the Projection Part is project.ProjectName.

The subset of rows selected will therefore be those shown in TABLE II:

TABLE II

| Department | Employee | Status | Line item name | Project name |
| --- | --- | --- | --- | --- |
| Software | Employee A | In progress | Line item 1 | Project 1 |
| Software | Employee B | In progress | Line item 2 | Project 2 |
| Software | Employee B | In progress | Line item 3 | Project 2 |
| Software | Employee C | In progress | Line item 4 | Project 2 |

The return value for children of this selected facet node will be {Project 1, Project 2}.

As described in block 208, the children of value nodes are then computed. In this case, the complete path will end in a value, and therefore, there will be no Projection part to the faceted query generated. The Selection part will be computed similar to the first step described for block 206. There are two strategies (options) that can be followed here: List all facets (column headings from input data) as children of the value node, OR List all facets (column headings from input data) except those facets that are already in the Selection part of the faceted query, as children of the value node. The first option allows multiple value selection for a single facet, while the second option allows only one value to be selected for a single facet.

Figure 4:
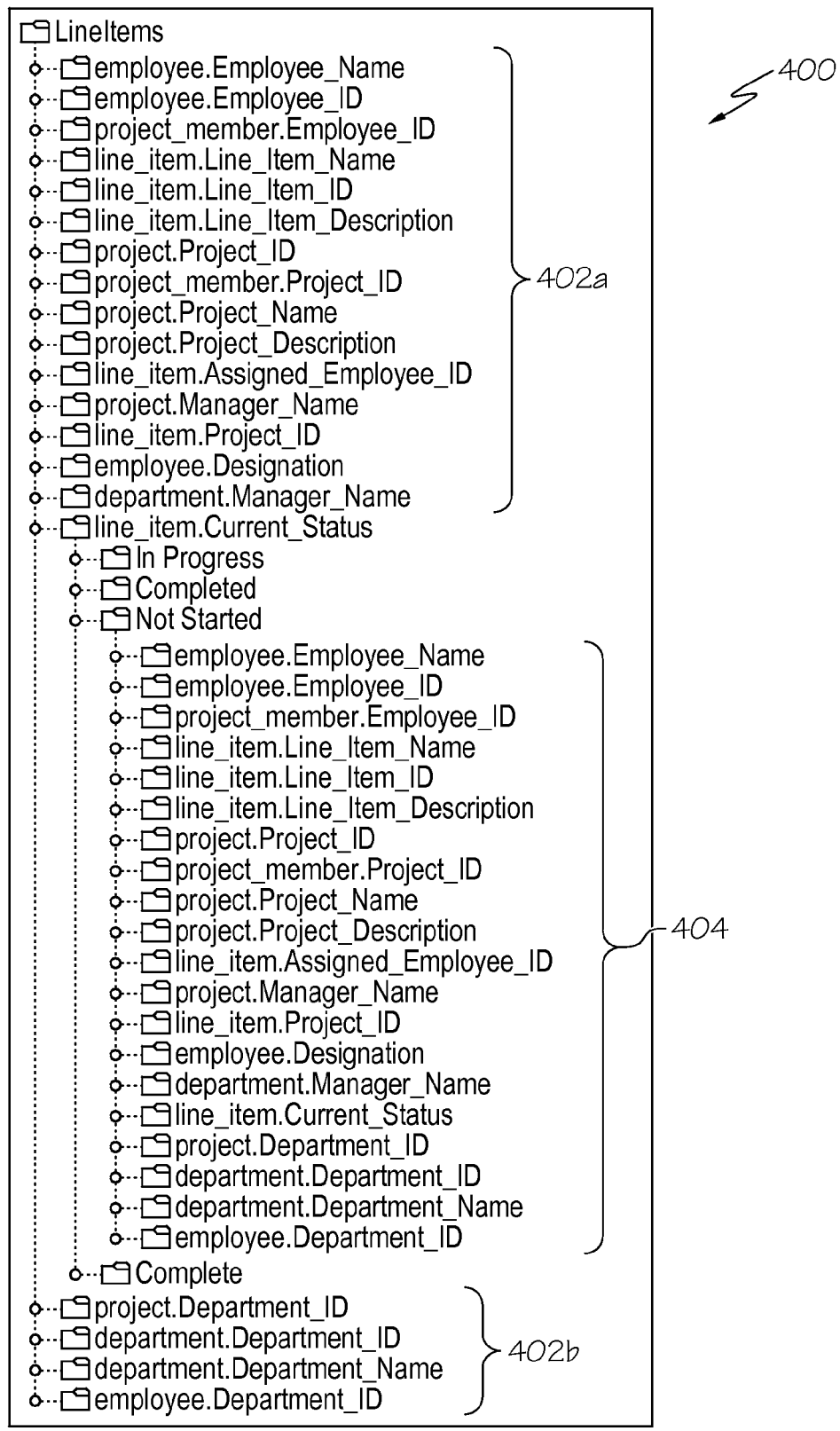
FIG. 4 depicts an exemplary multi-tree widget used to present faceted data for user retrieval.

As described in block 210, facet nodes of unexpanded facets are replicated as child facets of a selected facet, as depicted in FIG. 4 and described above.

Figure 5:
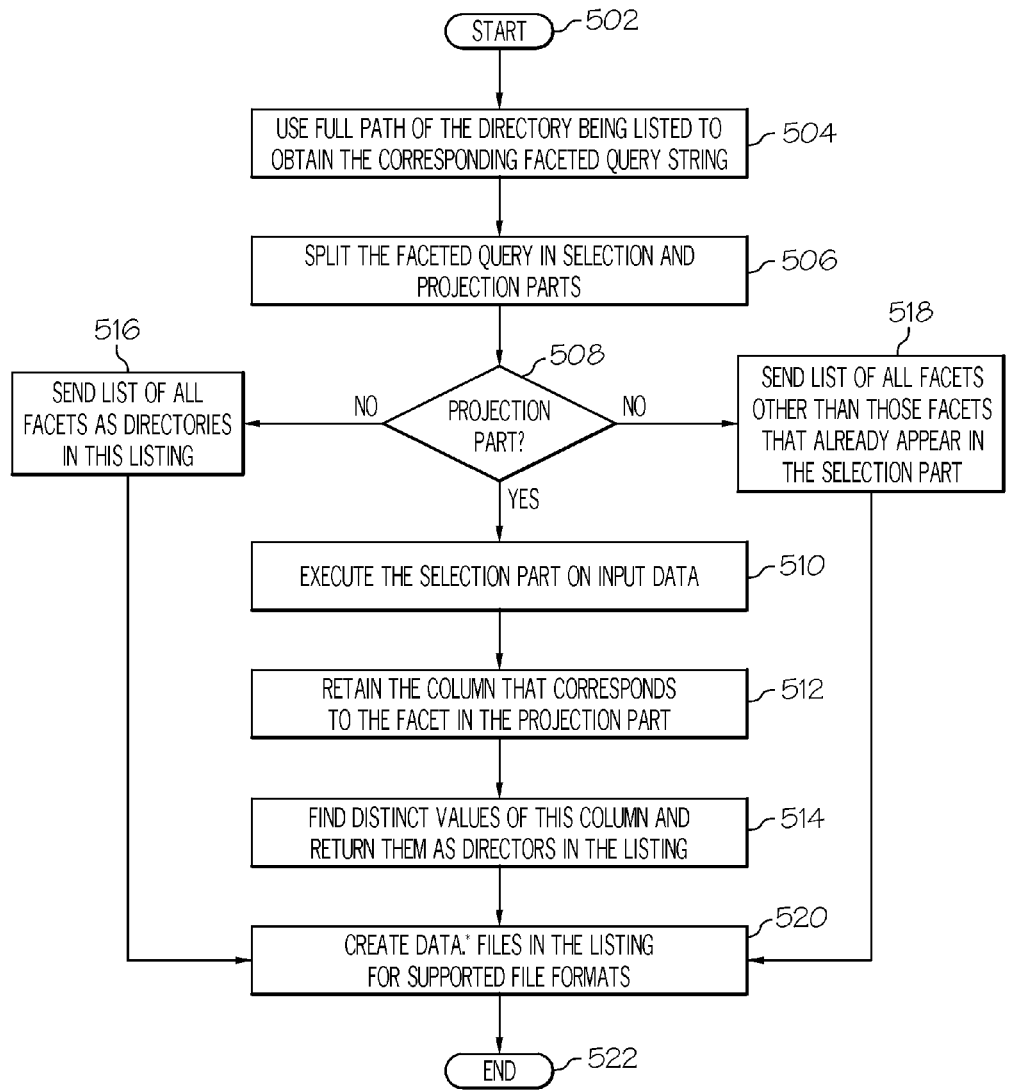
FIG. 5 is a high level flow chart of one or more steps executed by a processor to retrieve a directory.

As described in block 212, directory listings are then retrieved whenever a directory listing is requested from the file system driver according to a user's selection. FIG. 5 presents additional detail about the steps involved in searching for, retrieving, and displaying a file directory. Note that in one embodiment the directories (and their respective files) are not stored locally, but rather are references to remote locations for retrieval at run time.

After initiator block 502, the full path of the directory being listed is used to obtain the corresponding faceted query string (block 504). The initial segments of the path starting from root (/) until the name of the data set is ignored and the remaining segments are considered as faceted query. The faceted query is arranged such that there is an alternation between facet and facet value.

As described in block 506, the faceted query is split into Selection and Projection parts. If the query ends in a facet, then the last segment is considered to be the Projection part, and the remaining section of the faceted query is considered as Selection part. The Selection part, as noted before, will have alternating facet and value segments. Each value in this query corresponds to the facet that appears before it.

A query is thus made as to whether there is a Projection part to the faceted query (query block 508). If yes, then the Selection part is executed on input data (block 510). This means that only those rows of the input table that satisfy the facet constraints in the Selection part are retained. As depicted in block 512, the column that corresponds to the facet in the Projection part is retained. As described in block 514, distinct values of this column are found and returned to the requester as directories in the listing.

Returning to query block 508, if there is no Projection part, there are two possible strategies. The first strategy is described in block 516, in which the list of all facets (column headings) is sent as directories in this listing. The second strategy is described in block 518, in which the list of all facets (column headings) other than those facets that already appear in the Selection part of the faceted query are sent as directories in this listing.

Whether there is a Projection part or not, data.*files are created in the listing for supported file formats (mime types)—like data.xml, data.json, data.html, data.txt, etc.

For example, assume input data is from TABLE I shown above. The directory listing being asked for is /FFS/LineItems/Department/Software/Project, the Faceted Query=Department/Software/Project, the Selection Part is Department=Software, and the Projection part is Project. When the widget is executed, then the rows shown in TABLE III are returned.

TABLE III

| Department | Employee   | Status      | Line item name | Project name |
|------------|------------|-------------|----------------|--------------|
| Software   | Employee A | In progress | Line item 1    | Project 1    |
| Software   | Employee B | In progress | Line item 2    | Project 2    |
| Software   | Employee B | In progress | Line item 3    | Project 2    |
| Software   | Employee C | In progress | Line item 4    | Project 2    |
| Software   |            |             |                | Project 3    |
| Software   |            |             |                | Project 4    |

Notice that TABLE I had no entry under Employee, Status, Line item name for Projects 3 and 4, and thus TABLE III also has no such entries.

Distinct values from the column that is part of Projection. In this case, it is EProject":={Project 1, Project 2, Project 3, Project 4}. In this case, data.xml, data.json, data.html and data.txt are also added.

Therefore the entire directory listing will be ([d] means directory, [f] means file):

| Project 1[d] | Project 2[d] | Project 3[d] | Project 4 [d] |
|--------------|--------------|--------------|---------------|
| data.xml[f]  | data.json[f] | data.html[f] | data.txt[f]   |

When dealing with large data corpus, the number of facets and number of values for each facet may be very large. For example, the number of customers in an enterprise database may run into millions. This will mean that a node like CustomerName when expanded will result in a million children nodes. The following techniques are therefore innovative enhancements to the Faceted Multi-tree Widget in order to handle large amounts of data.

Threshold Value: This value is a user specified threshold value that determines the maximum number of children that can be displayed per node at a time.

Scrolling for every node: Unlike in the regular tree widgets where the entire tree widget is placed inside a scroll pane, and therefore the scrolling applies to the whole tree, in this case there is a scrolling facility for every node and its children. This is illustrated in search tree 600 shown in FIG. 6. Though there will not be a scroll bar on the right for every node's children, there will be a 'scroll Down" and 'scroll Up" buttons which can be used to navigate content that are not displayed in the visible area for the node's children.

Search Box (element 602): For every node, when expanded, if the number of children is greater than a user configured threshold value, a search box is presented. Only a subset of the children (lesser than the threshold configured) will be displayed as children. The search box will enable the users to type for anything they are looking for, and be able to view search results as indicated in the next feature.

Figure 6:
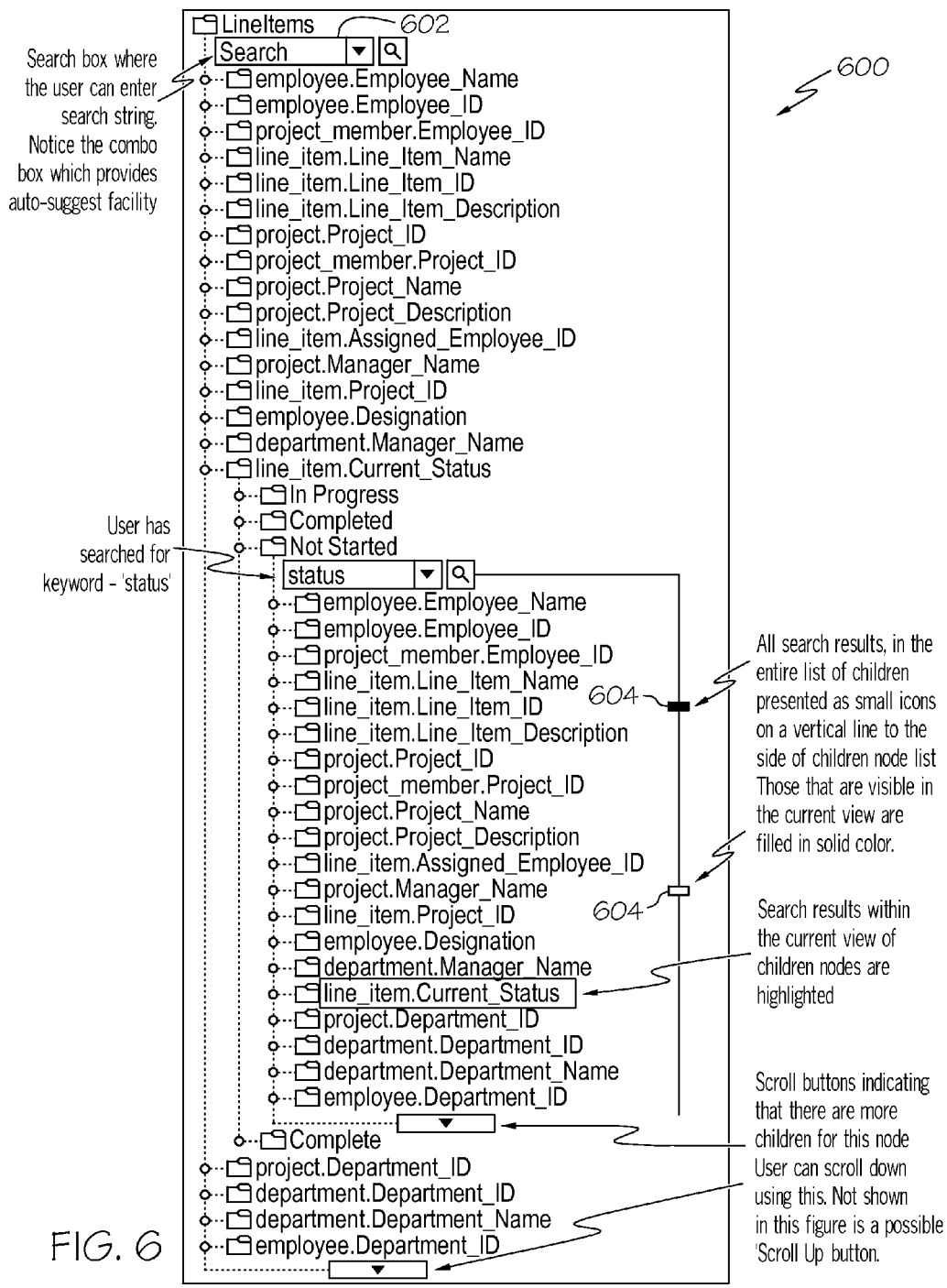
FIG. 6 illustrates an exemplary search widget on an expanded multi-tree.

Search Results: The search results are indicated as small point icons 604 on the right of the children listing for a node, as illustrated in FIG. 6. As depicted in FIG. 6, one embodiment of the present disclosure has search combo boxes, scroll buttons and other items as pseudo-children on a node, in order to achieve the effect shown. The connection here is to use such a facility for every node that has children more than the specified threshold. Note that only the children nodes within the threshold required are to be fetched from the data corpus. This will mean that methods in blocks 206 and 208 will have to accommodate a "limit" or "range" function in their queries. With reference again to FIG. 2, the process ends at terminator block 214.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of presenting and retrieving data directories, the method comprising:
 a processor initializing a facet tree to present stored tabular data and dynamically entered user-input data, wherein the stored tabular data and user-input data have been converted into a faceted data format, and wherein the facet tree presents multiple facet nodes that represent directories for the stored tabular data and user-input data;
 the processor, in response to a single facet node from the multiple facet nodes being selected by a user, expanding the single facet node by presenting, on the facet tree, all other facet nodes from the multiple facet nodes as children of the single facet node that was selected by the user, wherein expanding the single facet node causes said all other facet nodes to be displayed both in their original positions in the facet tree and as children of the single facet node that was selected by the user; and
 the processor, in response to a child of the single facet node being selected, retrieving and presenting value directories for the child according to a definition of the single facet node that was expanded.

2. The method of claim 1, further comprising:
 in response to a number of child nodes for a selected single facet node exceeding a maximum threshold, the processor presenting a scroll pane for the selected single facet node.

3. The method of claim 1, wherein value data for said all other facet nodes are from an unformatted source, the method further comprising:
 formatting the value data in said all other facet nodes according to a type of data that is supported by the selected single facet node.

4. The method of claim 1, further comprising:
 receiving a faceted query from a user, wherein the faceted query comprises a path that comprises a Selection part of intermediate facets;
 determining if the faceted query comprises a Projection part, wherein the Projection part is a facet that ends the path of the faceted query; and
 in response to determining that the faceted query does not comprise a Projection part, transmitting a list of all facets in the facet tree, other than those facets that already appear in the Selection part, to the user.

5. A computer program product for presenting and retrieving data directories, the computer program product comprising:
 a non-transitory computer readable storage media;
 first program instructions to initialize a facet tree to present stored tabular data and dynamically entered user-input data, wherein the stored tabular data and user-input data have been converted into a faceted data format, and wherein the facet tree presents multiple facet nodes that represent directories for the stored tabular data and user-input data;
 second program instructions to, in response to a single facet node from the multiple facet nodes being selected by a user, expand the single facet node by presenting, on the facet tree, all other facet nodes from the multiple facet nodes as children of the single facet node that was selected by the user; and
 third program instructions to, in response to a child of the single facet node being selected, retrieve and present value directories for the child according to a definition of the single facet node that was expanded; and wherein
the first, second, and third program instructions are stored on the non-transitory computer readable storage media.

6. The computer program product of claim 5, further comprising:
 fourth program instructions to, in response to a number of child nodes for a selected single facet node exceeding a maximum threshold, present a scroll pane for the selected single facet node; wherein the fourth program instructions are stored on the non-transitory computer readable storage media.

7. The computer program product of claim 5, wherein value data for said all other facet nodes are from an unformatted source, the computer program product further comprising:
 fourth program instructions to format the value data in said all other facet nodes according to a type of data that is supported by the selected single facet node; and wherein the fourth program instructions are stored on the non-transitory computer readable storage media.

8. The computer program product of claim 5, further comprising:
 fourth program instructions to receive a faceted query from a user, wherein the faceted query comprises a path that comprises a Selection part of intermediate facets;
 fifth program instructions to determine if the faceted query comprises a Projection part, wherein the Projection part is a facet that ends the path of the faceted query; and
 sixth program instructions to, in response to determining that the faceted query does not comprise a Projection part, transmit a list of all facets in the facet tree, other than those facets that already appear in the Selection part, to the user; and wherein
the fourth, fifth, and sixth program instructions are stored on the non-transitory computer readable storage media.

9. A computer system comprising:
 a central processing unit (CPU), a computer readable memory, and a computer readable storage device;
 first program instructions to initialize a facet tree to present stored tabular data and dynamically entered user-input data, wherein the stored tabular data and user-input data have been converted into a faceted data format, and wherein the facet tree presents multiple facet nodes that represent directories for the stored tabular data and user-input data;
 second program instructions to, in response to a single facet node from the multiple facet nodes being selected by a user, expand the single facet node by presenting, on the facet tree, all other facet nodes from the multiple facet nodes as children of the single facet node that was selected by the user, wherein expanding the single facet node causes said all other facet nodes to be displayed both in their original positions in the facet tree and as children of the single facet node that was selected by the user; and third program instructions to, in response to a child of the single facet node being selected, retrieve and present value directories for the child according to a definition of the single facet node that was expanded; and wherein the first, second, and third program instructions are stored on the computer readable storage media for execution by the CPU via the computer readable memory.

10. The computer system of claim 9, further comprising:

fourth program instructions to, in response to a number of child nodes for a selected single facet node exceeding a maximum threshold, present a scroll pane for the selected single facet node; wherein the fourth program instructions are stored on the computer readable storage media for execution by the CPU via the computer readable memory.

11. The computer system of claim 9, wherein value data for said all other facet nodes are from an unformatted source, the computer system further comprising:

fourth program instructions to format the value data in said all other fact nodes according to a type of data that is supported by the selected single facet node; and wherein the fourth program instructions are stored on the computer readable storage media for execution by the CPU via the computer readable memory.

12. The computer system of claim 9, further comprising:

fourth program instructions to receive a faceted query from a user, wherein the faceted query comprises a path that comprises a Selection part of intermediate facets;

fifth program instructions to determine if the faceted query comprises a Projection part, wherein the Projection part is a facet that ends the path of the faceted query; and sixth program instructions to, in response to determining that the faceted query does not comprise a Projection part, transmit a list of all facets in the facet tree, other than those facets that already appear in the Selection part, to the user; and wherein the fourth, fifth, and sixth program instructions are stored on the computer readable storage media for execution by the CPU via the computer readable memory.

* * * * *